(12) United States Patent
O'Rell et al.

(10) Patent No.: US 9,126,299 B2
(45) Date of Patent: Sep. 8, 2015

(54) WORK HOLDER

(71) Applicant: Raptor Workholding Products, Inc., Burbank, CA (US)

(72) Inventors: Brian O'Rell, Simi Valley, CA (US); Dao Ha, Burbank, CA (US)

(73) Assignee: Raptor Workholding Products, Inc., Burbank, CA (US)

( * ) Notice: Subject to any disclaimer, the term of this patent is extended or adjusted under 35 U.S.C. 154(b) by 61 days.

(21) Appl. No.: 14/215,234

(22) Filed: Mar. 17, 2014

(65) Prior Publication Data

US 2014/0197587 A1 Jul. 17, 2014

Related U.S. Application Data

(63) Continuation-in-part of application No. 12/611,894, filed on Nov. 3, 2009, now Pat. No. 8,672,310.

(60) Provisional application No. 61/110,810, filed on Nov. 3, 2008.

(51) Int. Cl.
| | |
|---|---|
| *B25B 5/00* | (2006.01) |
| *B23Q 1/42* | (2006.01) |
| *B23Q 3/06* | (2006.01) |
| *B25B 5/10* | (2006.01) |
| *B25B 5/16* | (2006.01) |

(52) U.S. Cl.
CPC .. *B23Q 1/42* (2013.01); *B23Q 3/06* (2013.01); *B23Q 3/062* (2013.01); *B25B 5/10* (2013.01); *B25B 5/163* (2013.01); *B25B 5/166* (2013.01)

(58) Field of Classification Search
USPC .......................... 269/160, 172, 189, 240, 246
See application file for complete search history.

(56) References Cited

U.S. PATENT DOCUMENTS

| | | | |
|---|---|---|---|
| 565,425 A | | 8/1896 | Bolte et al. |
| 790,479 A | | 5/1905 | Carr |
| 1,454,148 A | | 5/1923 | Bisset |
| 4,221,391 A | | 9/1980 | Dutton |
| 4,300,271 A | | 11/1981 | Wohlhaupter |
| 4,577,846 A | | 3/1986 | Büchler |
| 4,909,110 A | | 3/1990 | Borzym |
| 5,019,129 A | | 5/1991 | Johanson |
| 5,423,524 A | | 6/1995 | Searle |
| 5,551,676 A | | 9/1996 | Tibbet |
| 5,551,795 A | * | 9/1996 | Engibarov ................... 403/381 |
| 5,649,694 A | | 7/1997 | Buck |
| 5,673,905 A | | 10/1997 | Kiene |
| 5,904,346 A | * | 5/1999 | Witte ............................ 269/71 |
| 6,174,102 B1 | | 1/2001 | Do et al. |
| 6,350,080 B1 | | 2/2002 | Do et al. |

(Continued)

FOREIGN PATENT DOCUMENTS

JP 02-100878 4/1990

*Primary Examiner* — Lee D Wilson
*Assistant Examiner* — Shantese McDonald
(74) *Attorney, Agent, or Firm* — Gregory Wood; Feldman Gale, P.A>

(57) ABSTRACT

A work holder which is adapted to hold a workpiece firmly in place for machining operations with respect to a machine tool. The workpiece is fashioned with a dovetail protuberance, which protuberance is designed to affix the workpiece to the work holder to the machining operations. Once the machining is completed, the dovetail protuberance may be removed in any convenient manner. Thus, the finished product may not then exhibit the former protuberance.

1 Claim, 7 Drawing Sheets

(56) References Cited

U.S. PATENT DOCUMENTS

| | | |
|---|---|---|
| 6,598,867 B2 | 7/2003 | Martinez |
| 6,957,809 B1 | 10/2005 | Ferrara et al. |
| 7,182,327 B1 | 2/2007 | Ferrara |
| 7,712,401 B1 | 5/2010 | Greenwald |
| 8,113,497 B2 | 2/2012 | Kellerson |
| 8,181,949 B2 * | 5/2012 | Hung .............................. 269/244 |
| 2010/0052234 A1 | 3/2010 | Ryai, Sr. |
| 2010/0219573 A1 | 9/2010 | O'Rell et al. |

* cited by examiner

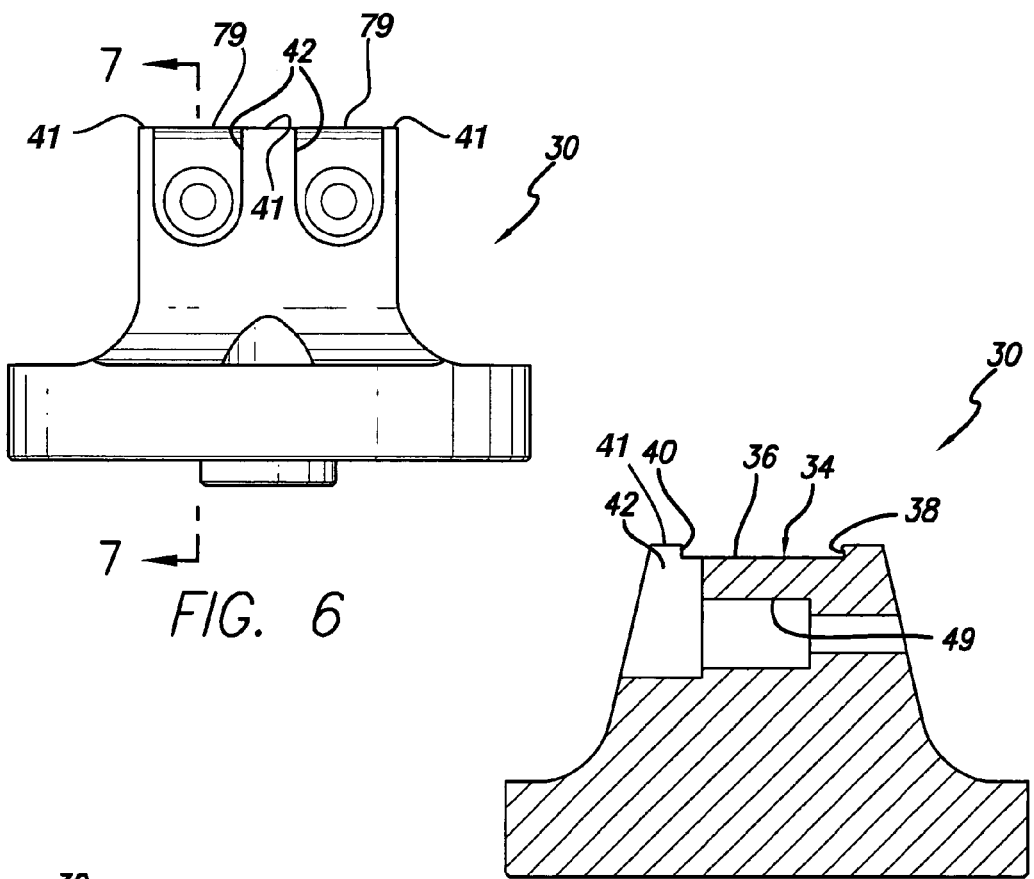
FIG. 6
FIG. 7
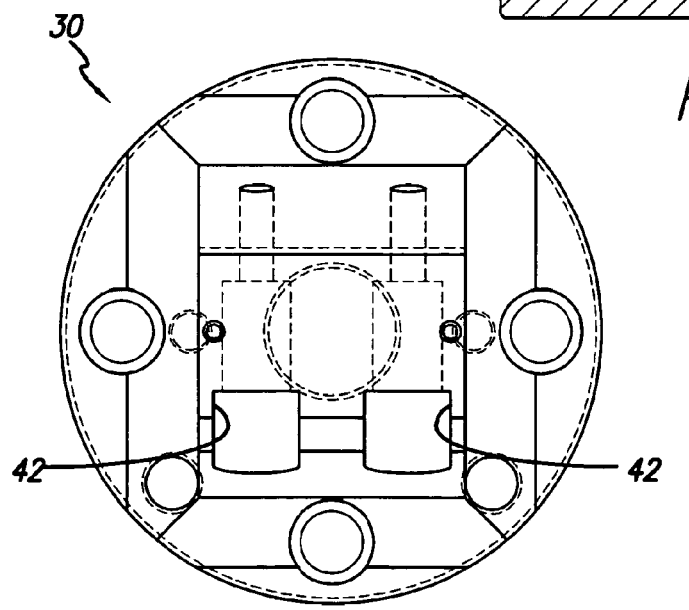
FIG. 8

WORK HOLDER

CROSS-REFERENCE TO RELATED APPLICATIONS

This application is a continuation-in-part of U.S. application Ser. No. 12/611,894, filed Nov. 3, 2009 which claims the benefit of U.S. Provisional Application Ser. No. 61/110,810, filed Nov. 3, 2008, the disclosure of each of which is hereby incorporated herein by reference in its entirety.

SUMMARY

The work holder is an intermediary dovetail fixture, which is adapted to hold a workpiece firmly in place for machining operations with respect to a machine tool, for example, a 5-axis vertical machining center, e.g, see www.matsuura-.co.jp. The workpiece is fashioned with a dovetail protuberance, which protuberance is designed to affix the workpiece to the work holder prior to the machining operations. Once the machining is completed, the dovetail protuberance is removed in any convenient manner, such as by being ground away. Thus, the finished product will not exhibit the former protuberance.

DRAWINGS

The attached illustrations depict the work holder, in which:

FIG. 6 is a view of the work holder taken 90.degree. with respect to that shown in FIG. 5;

FIG. 7 is a cross-section of the work holder taken along section line 7-7 of FIG. 6;

FIG. 8 is a top view of the work holder as previously shown;

Figure 11:
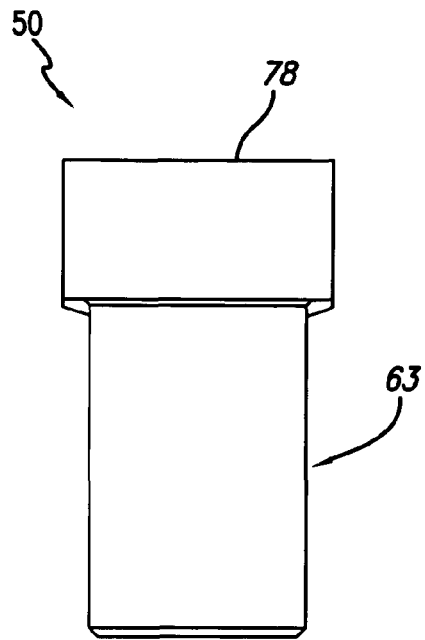
Figure 12:
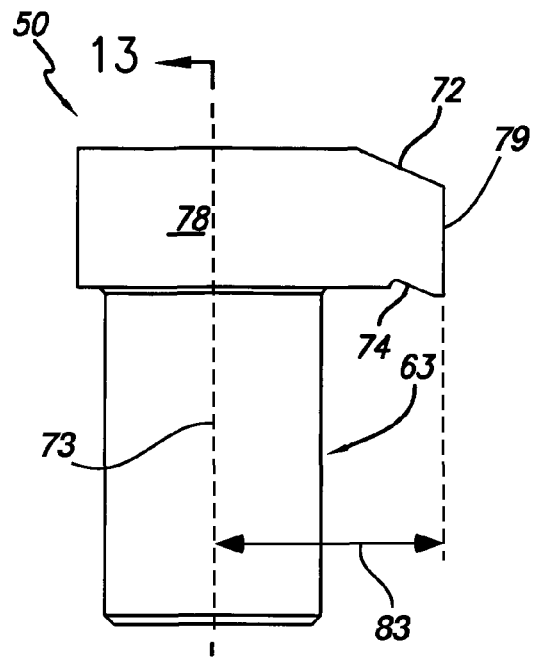
Figure 13:
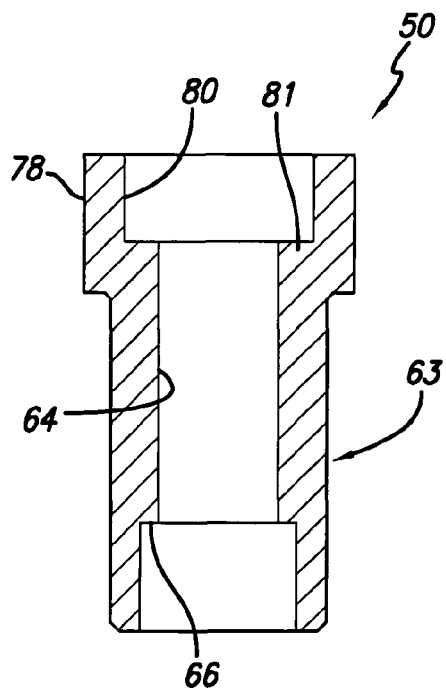
Figure 14:
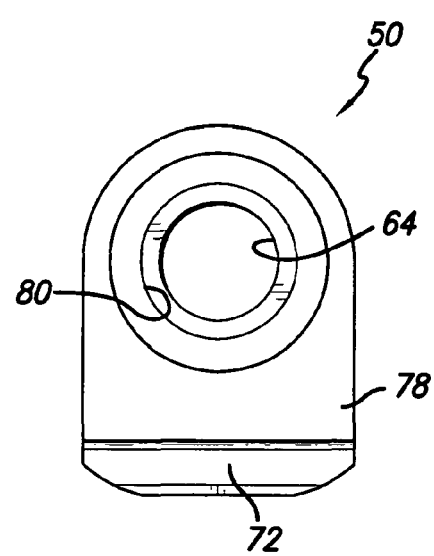

FIG. 11 a side view of one of the housings of the clamps used in the work holder used to grip the dovetail of the workpiece;

FIG. 12 is a side view of the swing clamp housing shown in FIG. 11, but turned 90.degree. therefrom;

FIG. 13 is a cross-sectional view of the clamp housing taken along section line 13-13 of FIG. 12; and FIG. 14 is an end view of the clamp illustrated in FIGS. 11-13.

DESCRIPTION OF PREFERRED EMBODIMENT

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
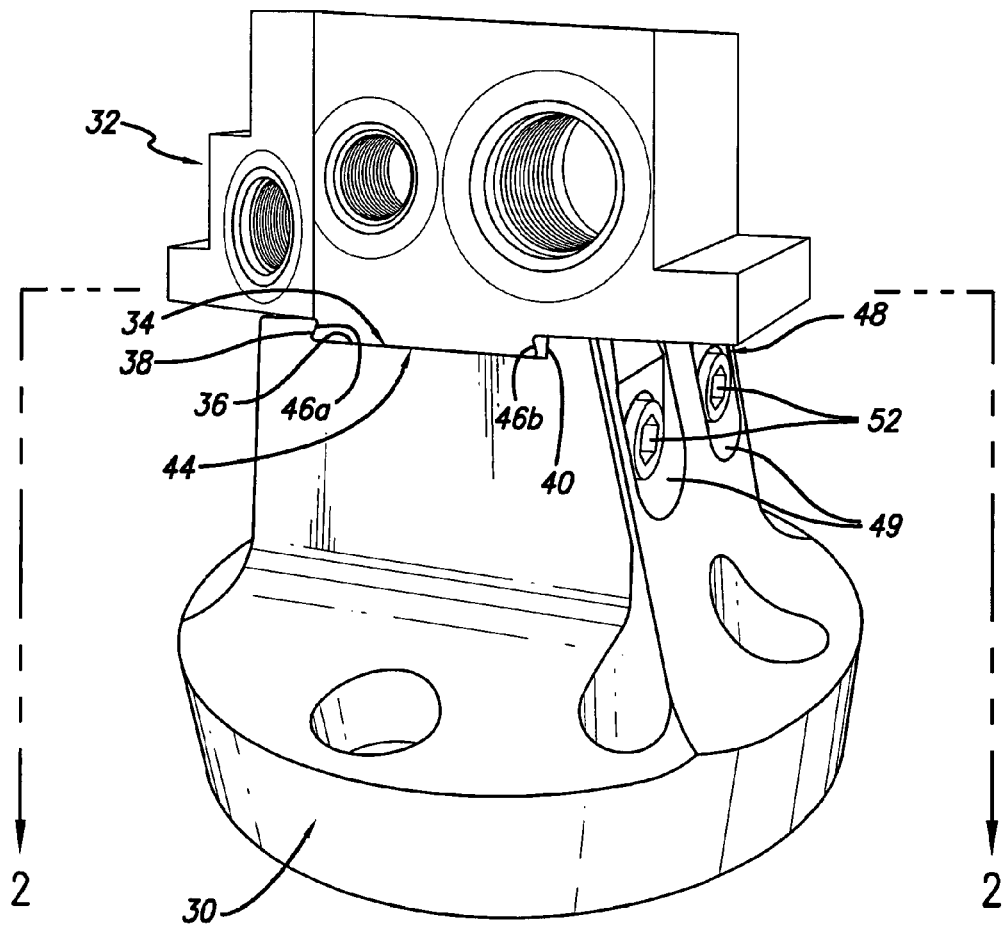
FIG. 1 is a perspective view of a workpiece secured to the work holder.
Figure 2:
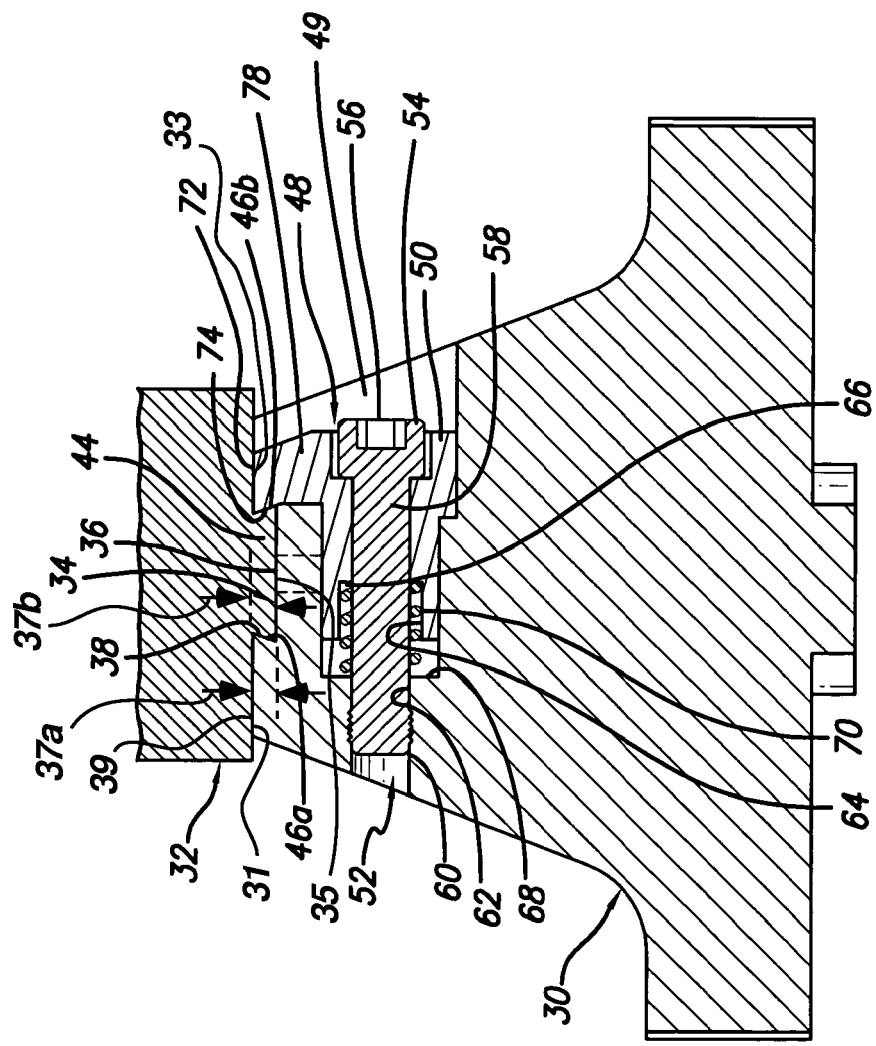
FIG. 2 is a cross-section of the mechanism taken along section line 2-2 of FIG. 1, by which the workpiece is secured to the work holder.
Figure 3:
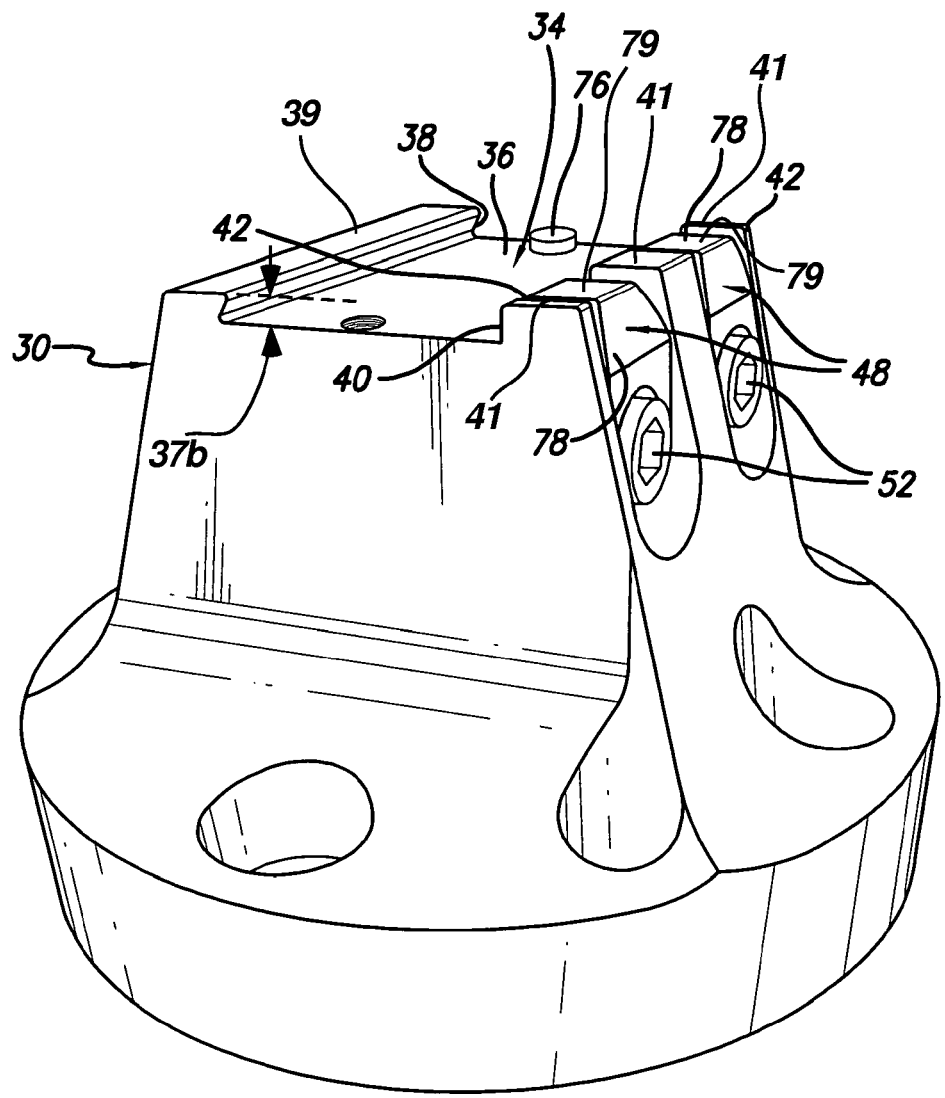
FIG. 3 depicts a perspective view of the work holder having a slot which is formed in its upper surface and which, at its opposed sides, has a slanted or dovetail side wall and a 90.degree. trifurcated straight-up side wall.
Figure 4:
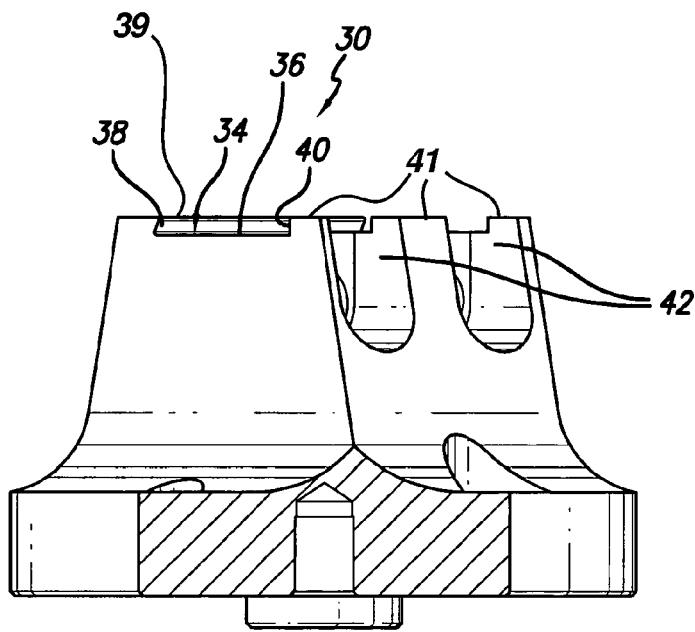
FIG. 4 is a partial cross-section of the work holder in perspective.
Figure 5:
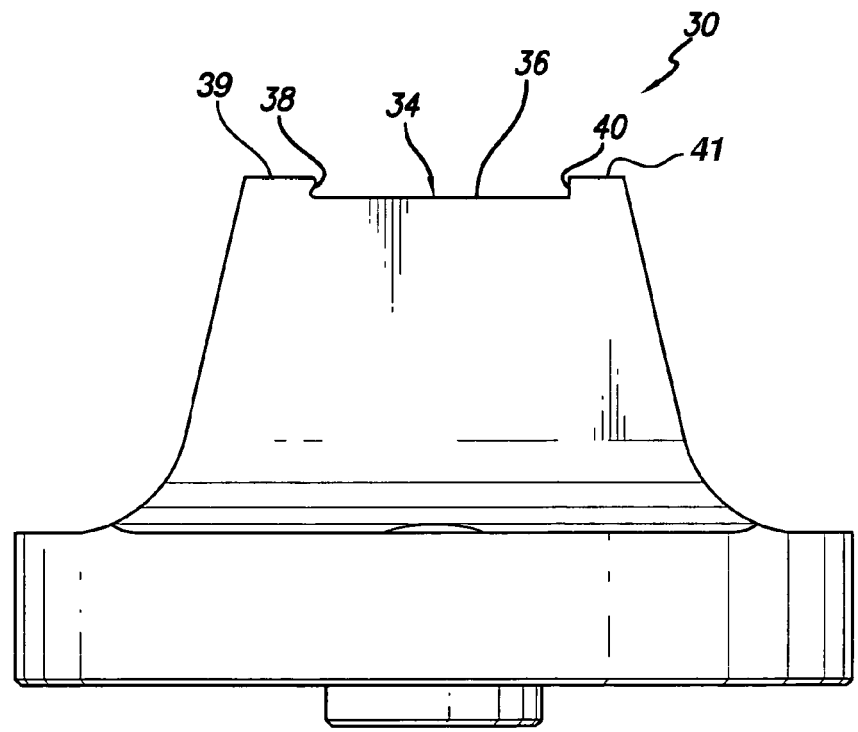
FIG. 5 is a side view of the work holder also depicting the slot with its slanted dovetail side wall and its 90.degree. trifurcated straight-up side wall.
Figure 9:
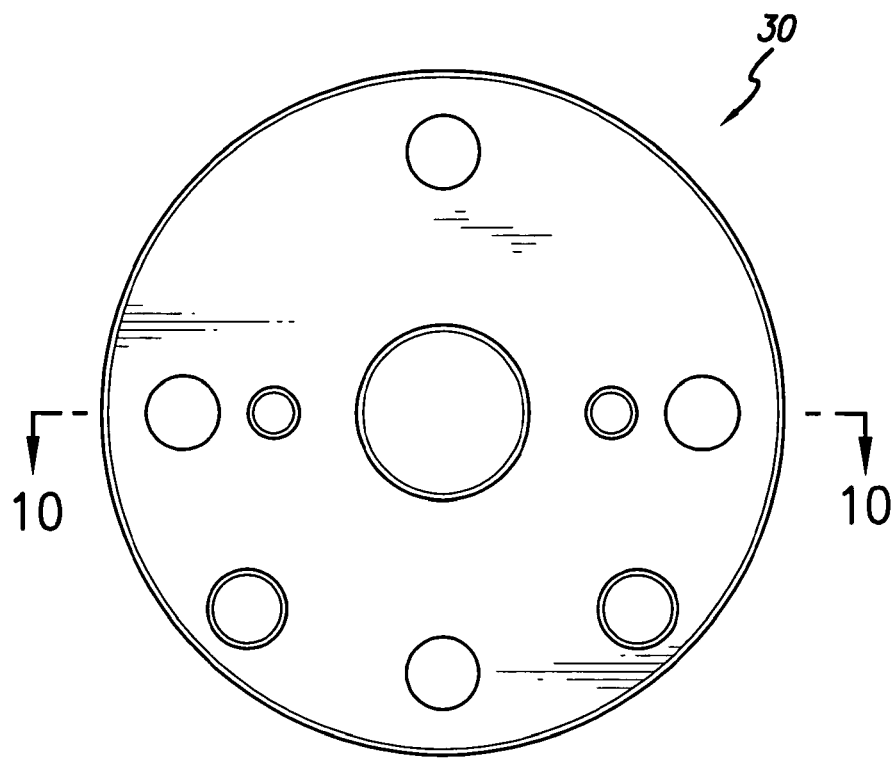
FIG. 9 is a bottom view of the work holder.
Figure 10:
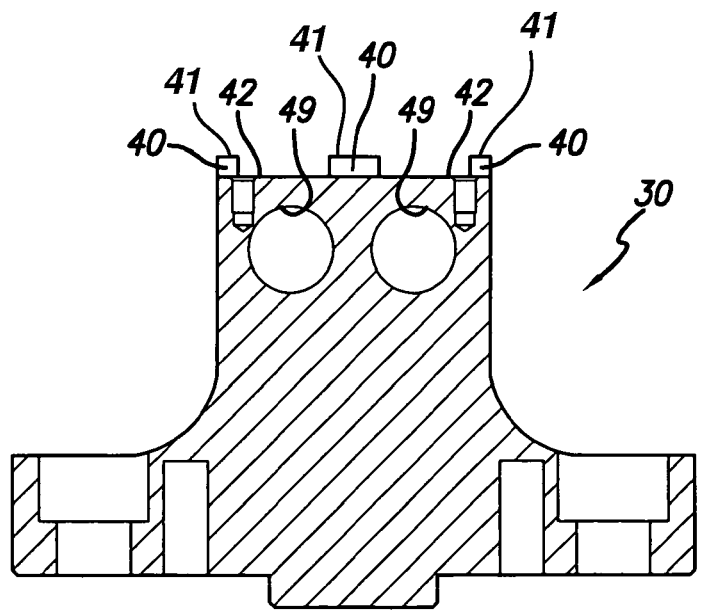
FIG. 10 is a cross-sectional view of the work holder taken along section line 10-10 of FIG. 9.

As illustrated in FIGS. 1 and 2, a work holder or support 30 is designed to firmly support, hold and grip a workpiece 32. As further shown in FIGS. 3-5 and 7, work holder is formed with a partial dovetail slot 34 having a bottom surface 36, a slanted side 38 that forms a dovetail and a trifurcated straight-up side 40, that is, side 40 is formed with a pair of openings 42. The slanted side 38 extends from the bottom surface 36 and terminates at a side top support surface 39 that extends alone one side of the partial dovetail slot 34. The trifurcated straight-up side 40 on the other side of the partial dovetail slot terminates in a corresponding trifurcated side top support surface 41 were each trifurcated section is substantially perpendicular to the corresponding section of the trifurcated straight-up sides 40. The slot depth 37a is substantially the same across the width of the partial dovetail slot 34 between the side top support surface 39 and the trifurcated side top support surface 41. Side 38 is slanted at an angle which is less than 90 degrees with respect to bottom surface 36 while straight-up side 40 is generally 90 degrees to the bottom surface, 36 although this orthogonal inclination is not critical, in that the trifurcation of side 40 (see also FIG. 6) provides openings 42 for embracing a pair of clamps, e.g., hook clamps 48. While the central section of side 40 is illustrated as wider than its outer sides, this need not be so.

Workpiece 32 is formed with an integral protuberance or projection 44 (see FIGS. 1 and 2) that is formed as shaped on the workpiece when it is fabricated. On its opposed edges, protuberance 44 is provided with a pair of dovetail sides 46a and 46b. Dovetail side 46a is disposed to contact slanted side 38 of dovetail slot 34 while dovetail side 46b is positioned adjacent to but spaced from trifurcated straight-up side 40 and openings 42 for reasons to be presently discussed also with reference to FIGS. 11-14 in conjunction specifically with FIG. 2. The protuberance 44 also defines a slot facing surface 35 for facing the bottom surface 36 and workpiece support surfaces on each side of the protuberance. A first workpiece support surface 31 is positioned to face the side top support surface 39 and a second workpiece support surface 33 is positioned to face the trifurcated side top surface 41. The thickness 37b of the protuberance 44 is approximately the same as the slot depth 37a for reasons to be explained hereafter.

Accordingly, a pair of clamps 48 (as modified from a generic form) are disposed to reside within respective bores 49 in work holder 30. Each clamp includes a housing 50 (see FIGS. 2 and 11-14) and a screw 52 having an enlarged head 54 (see also FIG. 2), in which an Allen head wrench opening 56 is disposed, and a shank 58. Shank 58 has a threaded end 60 for engagement with threaded openings 62 in work holder 30.

As best shown in FIGS. 2 and 13, clamp 50 includes a tubular stem 63, and a recess 64 is shaped in each clamp housing 50 to provide a shoulder 66. A corresponding shoulder 68, which terminates bore 49, faces clamp housing shoulder 66. Springs 70 are fitted about shank 58 of screw 50 and respectively abut at their ends against shoulders 66 and 68. Housing 50 is also provided with a head 78 at one end of tubular stem 63. An extension 72 (see FIGS. 12 and 14) extends from head 78 and includes a slanted surface 74 which is adapted to engage dovetail side 46b of workpiece protuberance 44 (see also FIG. 2). The slanted surface 74 terminates in a head top support surface 79. The distance 83 between the head top support surface 79 and the center axis 73 of the tubular stem 63 is defined so that the head top support surface 79 is generally in planar alignment with the trifurcated side top support surface 41 when the clamp 50 is in position in the work holder bore 49. Slanted surface 74 in part differentiates clamps 48 from the generic, e.g., hook clamp form. Head 78, terminating shank 63, further has an opening 80 for retention of screw head 54 and defines a flat bearing surface 81.

In operation, as each screw 52 is threaded into threaded opening 62, against the bias of spring 70, each enlarged head 54 of each screw 52 bears against its respective surface 81 on housing 50. This movement causes slanted surfaces 74 of the respective housings to move within and to be guided by openings 42 and to engage dovetail side 46b on protuberance 44 as well as to press opposite protuberance dovetail side 46a of workpiece 32 against dovetail slanted side 38. As each clamp 50 is further tightened, the slanted surface 74 not only clamps the protuberance 44 of the workpiece laterally between the dovetail side 46a and 46b but also pulls the workpiece 32 vertically, that is, toward the work holder 30 as the slanted surfaces slide against one another in response to the tightening. The result is that when fully tightened, the slot facing surface 35 of the workpiece will be urged to press against the bottom surface 36 of the dove tail slot 34 and the first workpiece support surface 31 will be urged to press against the side top support surface 39 of the work holder 30 and the second workpiece support surfaces 33 will be urged to press against the trifurcated side top support surface 41 and the head top support surface 79 which is general alignment with the trifurcated side top support surface 41. As a consequence, work holder 30 and workpiece 32, through its protuberance 44, are secured into a fixed engagement to and within work holder 30 both laterally though the clamping movement as the screw 52 to urged the opposing dovetail surfaces of the work piece and the support 30 into contact and vertically as the opposing dovetail surfaces pull the support surfaces into contact in a direction perpendicular to the center axis 73 to thereby provide a work holder which holds a workpiece firmly in place vertically and horizontally with respect to a machine tool.

A machine screw 76 (see FIG. 3) may be placed in within surface 36 of slot 34 to act as a positioning stop for the workpiece.

After all machining operations are completed on the workpiece, screws 52 are unscrewed to permit the workpiece to be released from the work holder. Protuberance 44 may be then machined away and accordingly removed from the workpiece.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A clamp assembly in an apparatus for holding a workpiece, the workpiece having an integral protuberance for being grasped laterally by the apparatus, the apparatus having a work holder with a bore therein where the bore has a threaded opening and a terminal shoulder, the work holder further having a top surface with a slot therein, the slot having a bottom surface and a first side that forms a dovetail, wherein the clamp assembly comprises:
   a housing having a tubular stem having a center axis for extending into the bore, the tubular stem having a recess having a corresponding shoulder for facing said terminal shoulder of the work holder, an enlarged head for being positioned outside the bore with an extension having a second side forming a dovetail for being positioned opposite the first side of the slot for engaging the workpiece protuberance between the first side of the workholder slot and the second side of the enlarged head, the enlarged head further having a workpiece support surface generally parallel to the center axis and spaced from the center axis for positioning the workpiece support surface to press against the workpiece as the clamp assemble engages the workpiece;
   a screw having a threaded shank adapted to engage with threaded bore in said work holder; and
   a spring around the screw shank for being positioned between the terminal shoulder of the work holder bore and the corresponding shoulder of the clamp housing, the workpiece support surface being urged into pressing contact with the workpiece in a direction perpendicular to the direction of the movement of the screw to clamp the protuberance.

* * * * *